May 17, 1932. C. W. P. HEYLANDT Re. 18,476
METHOD AND DEVICE FOR THE REGASIFICATION OF LIQUEFIED GASES
Original Filed Feb. 16, 1928
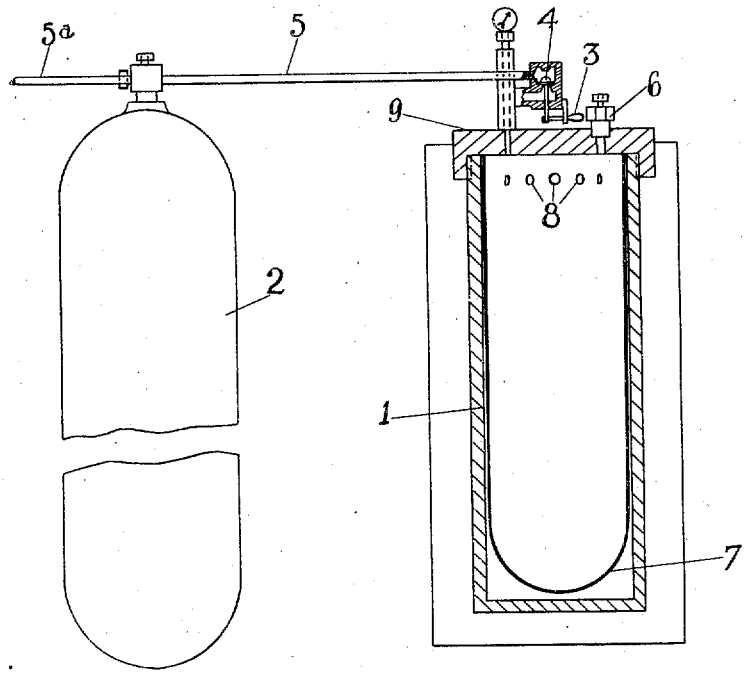
INVENTOR
Christian Wilhelm Paul Heylandt
BY
Watson, Bristol, Johnson & Leavenworth
ATTORNEYS Reissued May 17, 1932

Re. 18,476

UNITED STATES PATENT OFFICE

CHRISTIAN WILHELM PAUL HEYLANDT, OF BERLIN-BRITZ, GERMANY

METHOD AND DEVICE FOR THE REGASIFICATION OF LIQUEFIED GASES

Original No. 1,747,366, dated February 18, 1930, Serial No. 254,913, filed February 16, 1928, and in Germany March 29, 1927. Application for reissue filed February 12, 1932. Serial No. 592,639.

This invention relates to a process and apparatus for regasifying liquefied gases, and has for its object generally the provision of a procedure for increasing the rate of gasification of the liquid in containers of the pressure variety, and to provide suitable containing devices for carrying out the procedure.

It has been ascertained that when liquefied gases are introduced into containers of the pressure variety for the purpose of gasifying the same to provide compressed gas, the gasification proceeds relatively slowly after the container has been closed. This is particularly true at the beginning by reason of the fact that it is customary to provide the container with means to minimize the vaporization and gas loss during filling.

In accordance with the present invention, the delay in the procedure of obtaining gas at the final high pressure desired is greatly reduced. This is accomplished by introducing gas at a predetermined high pressure into the container of the liquefied gas, in order initially to increase the pressure within the gasification chamber. The supply of gas to be thus introduced is led from any convenient source, for example, from an auxiliary gas container which is connected by means of a suitable conduit to the gasification chamber. As a result, there is obtained a predetermined pressure in the gasification chamber which affects the physical properties of the gas and its environment so as to accelerate the transmission of heat into the liquid and thus increase the rate of gasification whereby in a relatively short time the liquefied gas introduced into the main container is converted entirely into gas at the desired pressure.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

The figure is a view partly in section and partly in elevation, showing exemplary apparatus constructed in accordance with and adapted for carrying out the process of the present invention.

Referring now to the drawing, 1 denotes a thick-walled vessel in which is disposed a thin-walled vessel 7 in spaced relation thereto. These vessels have a common cover 9, thereby forming a double-walled closed container adapted to receive and hold liquefied gas. This container is arranged to be in communication with an auxiliary container 2, which is effected by means of tubular connection 5 having communication with the main container, the flow of fluids through this connection being controlled by means of a valve 4 that is actuated by lever 3. The auxiliary container is also preferably provided with a connection $5^a$, which may serve as a consumption conduit.

The cover 9 is provided with a filling opening having a closure 6, whereby liquefied gas may be put into the main container at will. As the gas evolved, by the gasification of liquid within the chamber or vessel 7, tends to generate pressure therein, this vessel is provided with a plurality of openings 8 near its upper end communicating with the space between its wall and that of the outer vessel 1. The gas evolved thus passes into and fills the space between the walls of the inner and outer vessels and becomes an insulating envelope which intervenes between the body of liquefied gas and an external source of heat and has the characteristic of changing its physical properties with changes in its pressure. The rate of transfer of heat through the insulating envelope particularly is increased because the thermal conductivity of the insulating fluid is increased with the increase of pressure and vice versa, so that this fluid insulating body becomes a heat exchanging medium adapted to transfer heat to the walls of the inner vessel at a rate increasing with a rise in pressure.

In operation, it is seen that when the vessel 7 is filled with a charge of liquefied gas, the communication between the vessel 7 and the auxiliary container 2 is initially closed, but as soon as the main container is filled and the closure 6 in place, the valve 4 is opened by means of the lever 3 to permit gas at a predetermined pressure to enter the vessel 7 from the auxiliary container 2. This initial supply of gas operates immediately to affect the physical properties of the heat insulating medium between the walls of the vessels of the main container. If desired, the closure 6 of the main container may be connected with the lever 3, so as to admit gas from the auxiliary container 2 as soon as self-compression commences within the main container.

It will be readily understood that the practice of the present invention is not limited to the use of a single pressure container in communication with an auxiliary container, but instead, a plurality of each may be employed, for example, a plurality of main containers may be connected in series with a single auxiliary container, or a number of auxiliary containers may be connected with a single main container, or a number of auxiliary containers may be connected with a number of main containers.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The process of gasifying liquefied gases, which comprises depositing a body of liquefied gas in a vessel capable of being warmed and constructed to provide an envelope of heat insulation interposed between the deposited body of liquefied gas and the source of heat, and during gasification subjecting the said heat insulation to an increase in pressure from an external source whereby the rate of gasification is accelerated.

2. The process of gasifying liquefied gases, which comprises depositing a body of liquefied gas in a vessel capable of being warmed and constructed to provide an envelope of heat insulation interposed between the deposited body of liquefied gas and the source of heat, and during gasification changing the thermal characteristics of said heat insulation by the application of a relatively high pressure from an external source.

3. The process of gasifying liquefied gases, which comprises depositing a body of liquefied gas in a vessel capable of being warmed and constructed to provide an envelope of heat insulation interposed between the deposited body of liquefied gas and the source of heat, and during gasification quickly compressing said heat insulation by the application of pressure to increase the thermal conductivity of said heat insulation during gasification.

4. The process of gasifying liquefied gases, which comprises depositing a body of liquefied gas in a vessel capable of being warmed and constructed to provide an envelope of heat insulation interposed between the deposited body of liquefied gas and the source of heat, and during gasification introducing gaseous heat insulating material under relatively high pressure to said vessel whereby the heat insulation in said vessel is compressed and the rate of gasification accelerated.

5. The process of gasifying liquefied gases, which comprises disposing a body of liquefied gas in a vessel spaced from and arranged to be in heat insulating relation to an external source of heat, filling said space with a fluid medium the insulating properties of which change when subjected to pressure, and introducing a gas under a predetermined pressure to said space, whereby the rate at which heat is transferred to said liquefied body is augmented.

6. The process of regasifying liquefied gases which consists in filling said gases into a closed thin-walled receptacle disposed within a pressure vessel, and increasing the pressure in said receptacle and between it and the pressure vessel.

7. The process of gasifying liquefied gases, which comprises disposing a body of liquefied gas in a vessel spaced from and arranged to be in heat insulating relation to an external source of heat, filling said space with gas evaporated from said body of liquefied gas, and introducing additional gas under relatively high pressure to compress the gas evolved to a predetermined desired high pressure.

8. A process of gasifying liquefied gases, which comprises progressively increasing the pressure upon the liquefied gas during gasification by the introduction of a gas under a predetermined pressure, whereby heating and evaporation of the liquid are augmented.

9. The process of gasifying liquefied gases, which comprises subjecting the liquefied gas during gasification to increased pressure, whereby heating and evaporation of the liquid are augmented.

10. Apparatus for gasifying liquefied gases, comprising a container having inner and outer vessels in spaced relation, the inner vessel having communication with the space between said vessels, and means for supplying gas under high compression to said container provided with connections whereby it is adapted both to receive gas evolved from said container and to supply initial high pressure gas to the space between said vessels.

11. Apparatus for gasifying liquefied gases, comprising liquid receiving means having inner and outer vessels in spaced relation, a gaseous heat insulating medium between said vessels, and means for both supplying a pressure agent to change the physical properties of said insulating medium and receiving the gas evolved from said liquid receiving means.

12. Apparatus for gasifying liquefied gases, comprising a container having inner and outer vessels in spaced relation, the inner vessel having communication with the space between said vessels, and an auxiliary container having connections providing communication with said first-named container and adapted to receive gas evolved therefrom and to supply initial high pressure gas to the space between said vessels.

13. Apparatus for regasifying liquefied gases, comprising a pressure tank, a thin-walled receptacle disposed within and spaced from said tank, the interior of said receptacle communicating with the space between the receptacle and tank, and an auxiliary pressure gas receptacle in communication with said thin-walled receptacle.

14. Apparatus for gasifying liquefied gases, comprising a container having a relatively thick-walled outer vessel and a relatively thin-walled inner vessel supported in spaced relation to the wall of the outer vessel, the space between said vessel-walls being relatively narrow and by volume a comparatively small fraction of that encompassed by said inner vessel, said inner vessel being in communication with said relatively narrow space without said inner vessel, and a closure for said outer vessel provided with gas withdrawal and receiving connections.

15. Apparatus for gasifying liquefied gases, comprising a container having a relatively thick-walled outer vessel and a relatively thin-walled inner vessel supported in spaced relation to the wall of the outer vessel, the space between said vessel-walls being relatively narrow and by volume a comparatively small fraction of that encompassed by said inner vessel, said inner vessel being provided with means at its upper end affording communication between the spaces within and that without said inner vessel, means associated with said outer vessel for warming the same to effect gasification of liquefied gas when introduced into said inner vessel, and a closure for said outer vessel provided with a conduit having a valve for controlling both ingress and egress of gas material.

16. Apparatus for gasifying liquefied gases, comprising a container having a relatively thick-walled outer vessel and a relatively thin-walled inner vessel supported in spaced relation to the wall of the outer vessel, the space between said vessel-walls being relatively narrow and by volume a comparatively small fraction of that encompassed by said inner vessel, said inner vessel being provided with means at its upper end affording communication between the spaces within and that without said inner vessel, means associated with said outer vessel for warming the same to effect gasification of liquefied gas when introduced into said inner vessel, a closure for said outer vessel provided with a gas withdrawal conduit, and a valve in said conduit arranged when seated to stop the inflow of compressed gas into said container and to unseat automatically permitting outflow upon the attainment of a predetermined gas pressure within said container.

In testimony whereof I affix my signature.

CHRISTIAN WILHELM PAUL HEYLANDT.